United States Patent [19]
Watanabe

[11] Patent Number: 5,065,063
[45] Date of Patent: Nov. 12, 1991

[54] ROTATING APPARATUS

[75] Inventor: Yujiro Watanabe, Nagoya, Japan

[73] Assignee: Aisin Seiki Kabushiki Kaisha, Kariya, Japan

[21] Appl. No.: 598,789

[22] Filed: Oct. 17, 1990

Related U.S. Application Data

[63] Continuation of Ser. No. 330,445, Mar. 30, 1989, abandoned.

[30] Foreign Application Priority Data

Mar. 30, 1988 [JP] Japan ................. 63-76887

[51] Int. Cl.$^5$ .................. H02K 21/12; H02K 1/22
[52] U.S. Cl. ................... 310/156; 310/261; 310/262
[58] Field of Search ............ 310/156, 214, 218, 261, 310/262

[56] References Cited

U.S. PATENT DOCUMENTS

| | | | |
|---|---|---|---|
| 2,927,229 | 3/1960 | Merrill | 310/156 |
| 3,286,110 | 11/1966 | Pintar | 310/156 |
| 3,809,936 | 5/1974 | Klein | 310/171 |
| 4,243,900 | 1/1989 | Niven et al. | 310/49 R |
| 4,476,408 | 10/1984 | Honsinger | 310/156 |
| 4,549,341 | 10/1985 | Kasabian | 310/156 |
| 4,588,914 | 5/1986 | Heyne | 310/156 |
| 4,617,726 | 10/1986 | Denk | 310/156 |
| 4,631,435 | 12/1986 | McCarty | 310/156 |
| 4,691,132 | 9/1987 | Bertram et al. | 310/156 |
| 4,700,091 | 10/1987 | Wuthrich | 310/49 R |
| 4,725,750 | 2/1988 | Welch | 310/156 |
| 4,769,993 | 9/1988 | Kawamura | 60/597 |

FOREIGN PATENT DOCUMENTS

| | | | |
|---|---|---|---|
| 0058025 | 8/1982 | European Pat. Off. | 310/156 |
| 253918 | 3/1970 | U.S.S.R. | 310/156 |
| 286037 | 5/1971 | U.S.S.R. | 310/156 |

Primary Examiner—Steven L. Stephan
Assistant Examiner—C. LaBalle
Attorney, Agent, or Firm—Burns, Doane, Swecker & Mathis

[57] ABSTRACT

A rotating apparatus includes a stator, a rotor rotatable in the stator and made of nonmagnetic metal. An inner space with a pair of radially spaced openings is provided in the rotor and a permanent magnet is fitted in the inner space so as to be symmetrical with respect to the axis of the rotor. A magnetic metal section is connected to the rotor for filling each of the openings.

5 Claims, 7 Drawing Sheets

ROTATING APPARATUS

This application is a continuation of application Ser. No. 07/330,445, filed Mar. 30, 1989, now abandoned.

BACKGROUND OF THE INVENTION

1. Field of the Invention

The present invention relates to a rotating apparatus and in particular to a rotating apparatus in which a permanent magnet is provided within a rotor.

2. Description of Related Art

In a technical report issued July, 1980 by Densigijyutu-sogo-kenkyusho, a turbo expanding apparatus as a rotating apparatus is disclosed. The turbo expanding apparatus has a rotor which is rotated by a working gas such as helium. In the rotor, a permanent magnet is provided. Upon rotation of the rotor, the permanent magnet generates currents in a coil wound on a stator within which the rotor is rotated.

However, since the permanent magnet is connected to the rotor by shrink fitting or an expansion fit, the connecting strength therebetween is insufficient. Thus, during the rotation of the rotor at high speeds, the insufficiency of the connection strength could create an unbalanced condition o separation of the permanent magnet from the rotor.

SUMMARY OF THE INVENTION

It is, therefore, a principal object of the present invention to provide a rotating apparatus which obviates the aforementioned drawback.

Another object of the present invention is to provide a rotating apparatus in which a permanent magnet is reliably secured to a rotor.

According to the present invention, a rotating apparatus includes a stator, a rotor which is rotatable in the stator and made of nonmagnetic metal and having an inner space with a pair of radially spaced openings. A permanent magnet is fitted in the inner space so as to be symmetrical with respect to the axis of the rotor, and a magnetic metal is connected to the rotor so as to be received in each of the openings.

DETAILED DESCRIPTION OF THE DRAWINGS

The above and other objects, features and advantages of the present invention will become apparent and more readily appreciated from the following detailed description of preferred exemplary embodiment of the invention, taken in connection with the accompanying drawing, in which:

FIG. 19 is a partial plan view of a rotor used in a rotating apparatus in FIG. 18;

DETAILED DESCRIPTION OF THE PREFERRED EMBODIMENTS

Figures 1, 2:
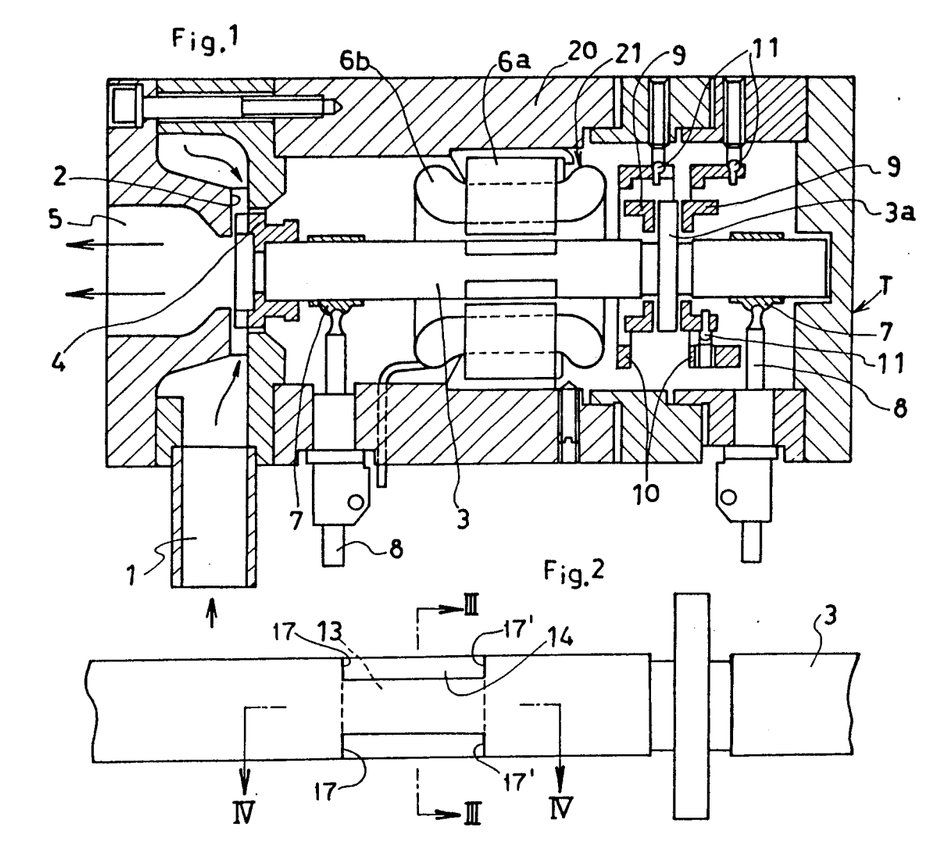
FIG. 1 is a cross-sectional view of a turbo expanding apparatus in which a rotating apparatus according to the present invention is employed as a dynamo.
FIG. 2 is a plan view of a turbo expanding apparatus shown in FIG. 1.

Referring now to FIG. 1, the present invention is applied to a dynamo of a turbo expanding apparatus T for use in a refrigerating system. The turbo expanding apparatus T has a casing 20. In the casing 20, there is provided a stator-core 6a around which a stator-coil 6b is wound. A rotor 3 passes through the stator-core 6a so that a gap may be defined therebetween and extends in the axial direction, as shown in FIG. 1. The opposite ends of the rotor 3 are rotatably supported by a pair of tilting pad type journal bearings 7 and 7' as gas-lubricated bearings and are restricted in radial movement. The bearings 7 and 7' are fixedly mounted to the casing 20 via a pair of stems 8 and 8'. A flange portion 3a of the rotor 3 is rotatably supported by a pair of axially spaced spiral-grooved type thrust bearings 9 and 9' as gas-lubricated bearings and is restricted from movement in the axial direction. The bearings 9 and 9' are connected to a ring 10 and pivot 11. A turbine 4 is connected to a left end of the rotor 3. The turbine 4 is in axial opposition to an outlet port 5 from which working gas is discharged and is also in radial opposition to a nozzle 2 which is in fluid communication with an inlet port 1 which supplies the working gas.

Figure 3:
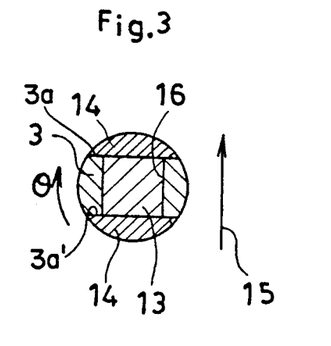
FIG. 3 is a cross-sectional view taken along line III—III in FIG. 2.
Figure 4:
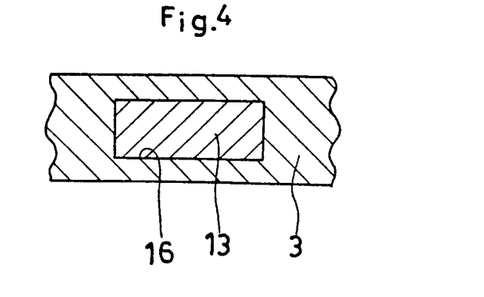
FIG. 4 is a cross-sectional view taken along line IV—IV in FIG. 3.
Figure 23:
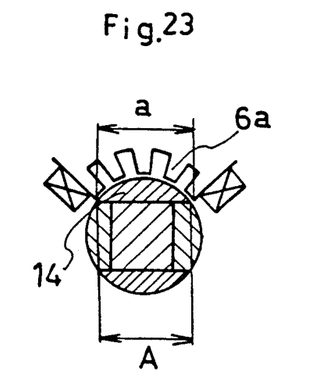
FIG. 23 is a view showing the relationship between the stator-core and a rotor.

From FIGS. 2 through 4, in detail, the rotor 3 is made of a nonmagnetic metal such as a stainless steel of an austenitic steel family and has a hole or an inner space 16. The space passes through an axis of the rotor 3 and is oriented in the radial direction. The space is symmetrical with respect to the axle of the rotor 3. Cut-out portions or openings are formed on the rotor 3 and are continuous with the space 16. Each cut-out portion is defined between an pair of axially spaced walls 17 and 17' and circumferentially spaced walls 3a, 3a'. The walls 17, 17', 3a, 3a' are of one-piece construction with the portion of the rotor through which the hole 16 extends, as can be seen in FIGS. 3 and 4. In the space 16, there is inserted a permanent magnet 13 so as to be symmetrical with respect to the axis of the rotor 3. Each cutout portion defined between the walls 17 and 17' is filled with a magnetic metal 14 such as a stainless steel of the martensite family. In detail, the magnetic metal 14 is welded to the rotor 3 by a laser-beam or an electronic-beam welder. The permanent magnet 13 is brought into a pre-stressed condition due to thermal shrinkage of each magnetic metal 14. During the welding of each piece of metal 14, the permanent magnet 13 cannot be affected by the heat. It is noted that numeral 15 denotes a magnetization direction of the permanent magnet 13 and each width 'A' in the circumferential direction of the magnetic metal 14 is equally set to correspond to the width 'a' of the inner surface of the stator-core 6a as shown in FIG. 23.

Figure 5:
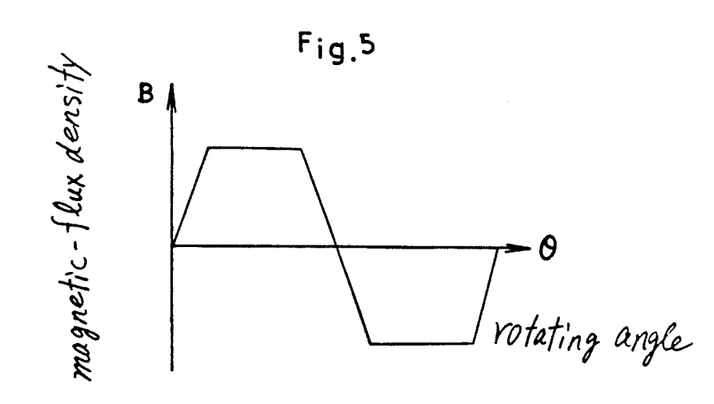
FIG. 5 is a chart showing the relationship between a rotating angle of a rotor shown in FIG. 2 and the magnetic-flux of a stator-core.

In the above-mentioned construction, a working gas such as helium is supplied under pressure to the inlet port 1, and is transferred therefrom by the nozzle 2 to the turbine 4. The resulting energy of the working gas rotates the turbine 3. After rotating the turbine 4 and the shaft 3 connected thereto, the working gas is exhausted through the outlet port 5. At this time, since the rotor 3 is rotated in the range 50,000-800,000 RPM, a magnetic-flux substantially as shown in FIG. 5 is generated at the stator-core 6a and constitutes a dynamo 21 in combination with the stator-coil 6b, thereby generating voltage or electromotive force at the stator-coil 6b.

In this embodiment, since the permanent magnet 13 is snugly held and is in a pre-stressed condition between the magnetic metals 14 and 14' in the rotor 3, any looseness or clearance between the permanent magnet 13 and the shaft 3 is prevented. Thus, the rotor 3 can be rotated at high speeds without fear of failure of the connections. Also, since most of centrifugal force applied to the permanent magnet 13 can be received at the magnetic metals 14, breakage or separation of the permanent magnet 13 and the rotor 3 can be avoided.

Figure 6:
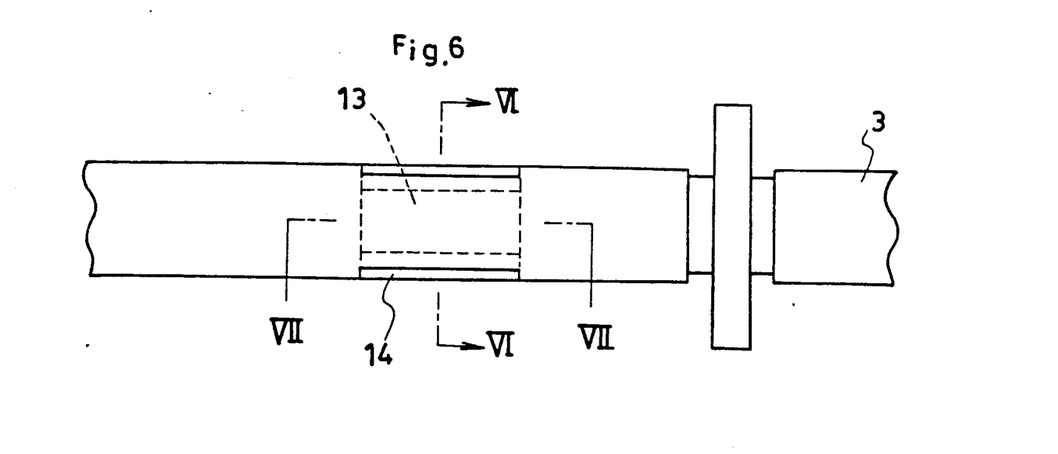
FIG. 6 is a plan view of a modification of a rotor.
Figure 7:
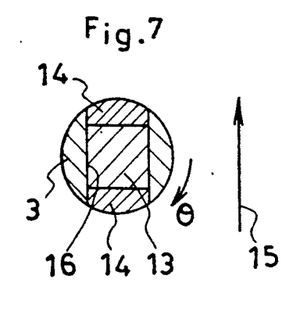
FIG. 7 is a cross-sectional view taken along the VI—VI in FIG. 6.
Figure 8:
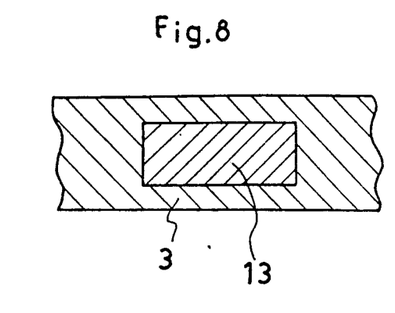
FIG. 8 is a cross-sectional view taken along line VII—VII in FIG. 6.
Figure 9:
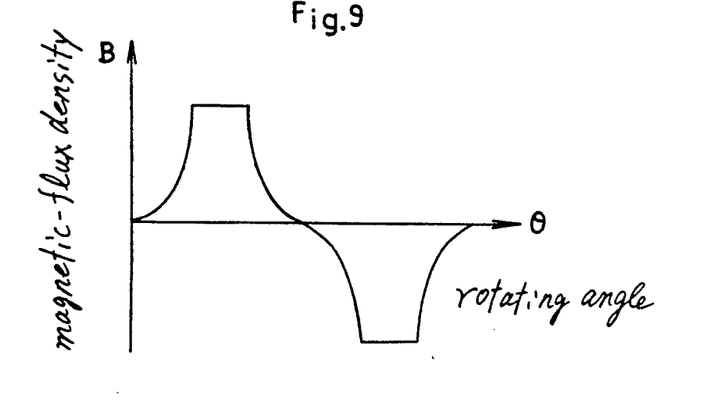
FIG. 9 is a chart showing the relationship between a rotating angle of a rotor shown in FIG. 6 and the magnetic-flux of a stator-core.

A modification of this invention as shown in FIGS. 5 through 8 and is similar to the construction shown in FIGS. 1 through 5 except that as shown in FIGS. 6 through 8 the embodiment is not provided with the walls 17 and 17'. Also, in the embodiment of FIGS. 1 through 5 each width in the circumferential direction of the metal 14 is less than that of the inner surface of the stator-core 6a so as to generate a concentrated magnetic-flux at the stator-core 6a, as shown in FIG. 9.

Figure 10:
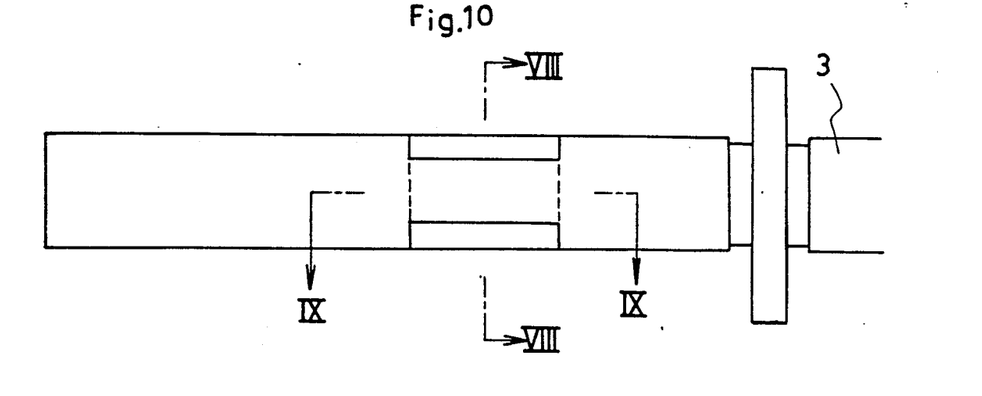
FIG. 10 is a plan view of another modification of a rotor.
Figure 11:
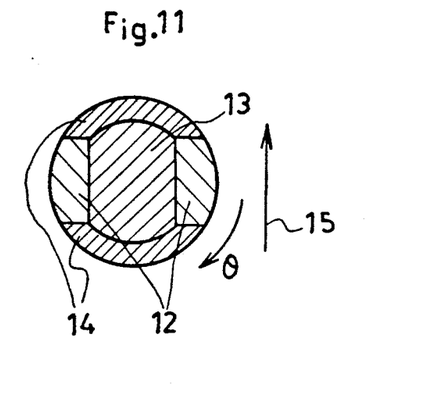
FIG. 11 is a cross-sectional view taken along line VIII—VIII in FIG. 10.
Figure 12:
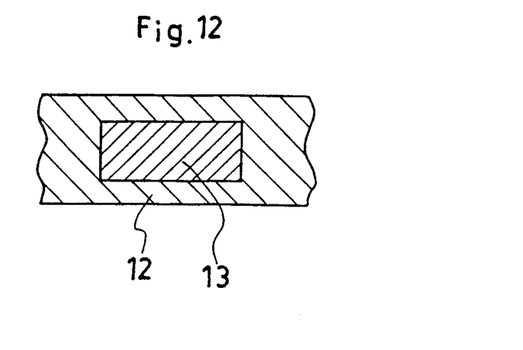
FIG. 12 is a cross-sectional view taken along line IX—IX in FIG. 10.
Figure 13:
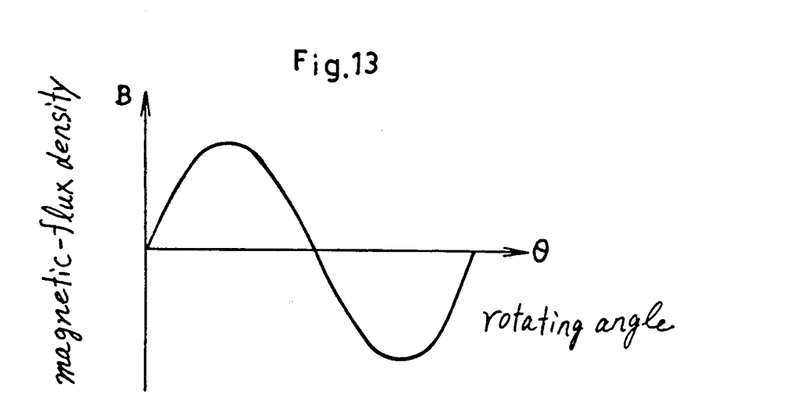
FIG. 13 is a chart showing the relationship between a rotating angle of a rotor shown in FIG. 10 and the magnetic-flux of a stator-core.
Figure 14:
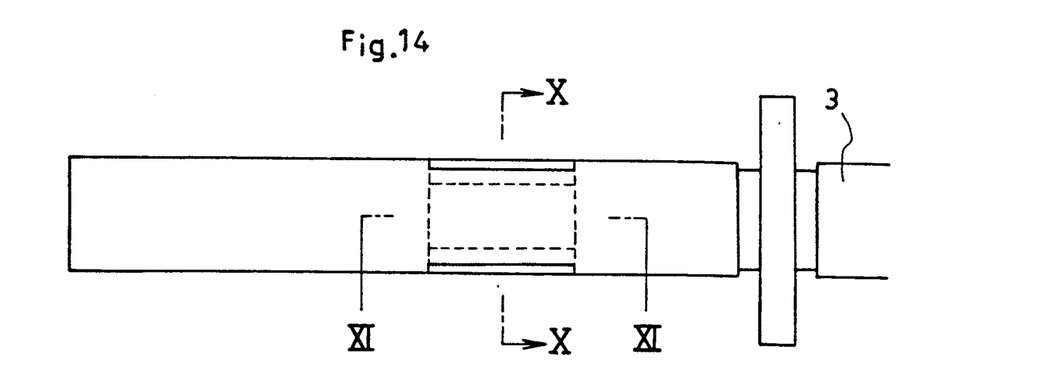
FIG. 14 is a plan view of a further modification of a rotor.
Figure 15:
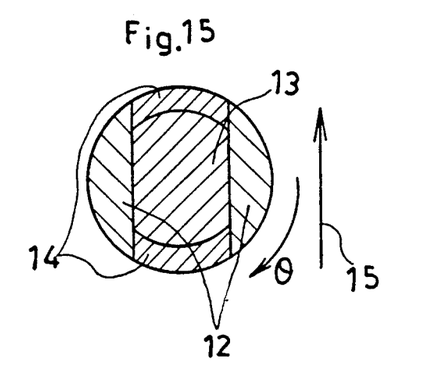
FIG. 15 is a cross-sectional view taken along the X—X in FIG. 14.
Figure 16:
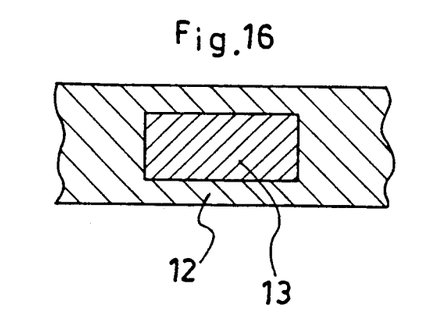
FIG. 16 is a cross-sectional view taken along line XI—XI in FIG. 15.
Figure 17:
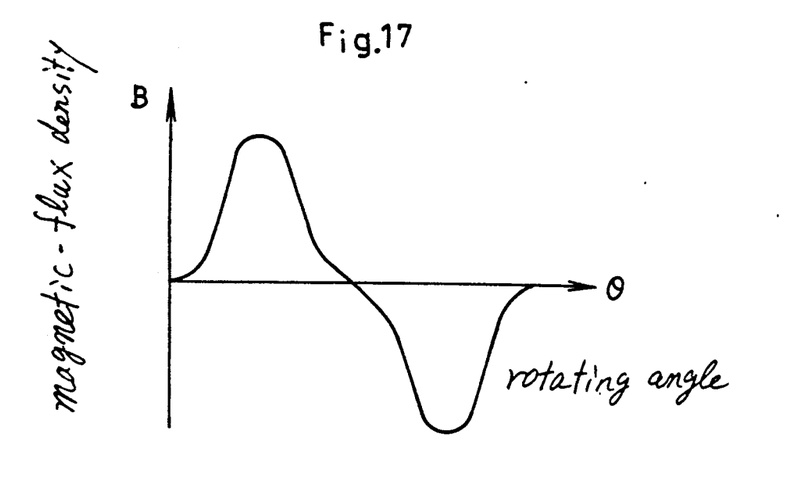
FIG. 17 is a chart showing the relationship between a rotating angle of a rotor shown in FIG. 14 and the magnetic-flux of a stator-core.

In another modification shown in FIGS. 10 through 12, the cross-section of the permanent magnetic 13 is formed into an overall configuration having parallel side walls 12a and convex end walls 13a which are convex in the radial direction and each magnetic metal 14 is of uniform thickness in the radial direction. Thus, a sin-curved magnetic-flux, shown in FIG. 13, can be generated at the stator-core 6a. Due to such magnetic-flux, iron or core loss at the stator core 6a can be reduced, thereby reducing the loss in power generation. It should be noted that the magnetic-flux include high frequency components, each of which is of rectangular form. The configuration of the magnetic metal 14 and related members thereto can be changed as shown in FIGS. 14 through 16 and the width in the circumferential direction of the metal 14 is smaller than that of the inner surface of the stator-core 6a. Thus, a sin-curved magnetic flux as shown in FIG. 17 can be generated at the stator-core 6a.

Figure 18:
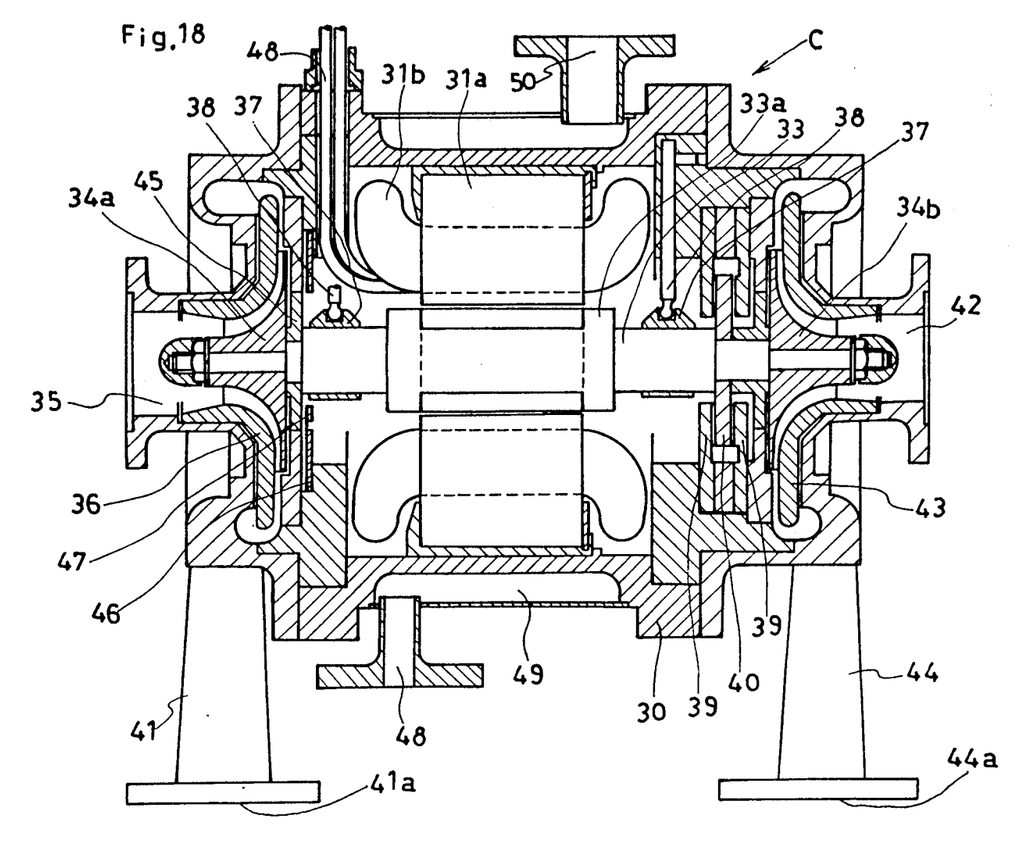
FIG. 18 is a cross-sectional view of a turbo compressor in which a rotating apparatus according to the present invention is employed as a dynamo.
Figure 20:
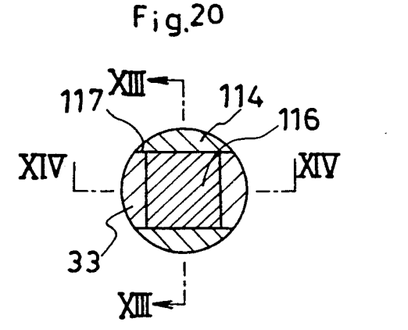
FIG. 20 is a cross-sectional view taken along line XII—XII in FIG. 19.
Figure 21:
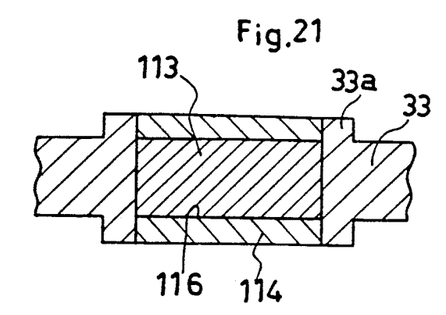
FIG. 21 is a cross-sectional view taken along line XIII—XIII in FIG. 20.
Figure 22:
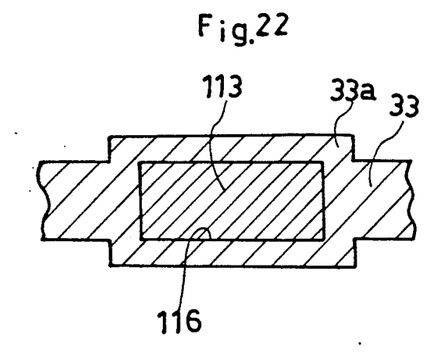
FIG. 22 is a cross-sectional view taken along line XIV—XIV in FIG. 22.

In FIG. 18, the rotating apparatus according to the present invention is used as a DC brushless motor of a turbo compressor C to be utilized in a cryogenic refrigerator. The turbo expanding apparatus C includes a casing 30. In the casing 30, a stator-core 31a is provided and therearound a stator-coil 31b is wound. An enlarged portion 33a of a rotor 33 is loosely fitted within the stator-core 31a. Opposite ends of the rotor 33 are rotatably supported by a pair of gas-lubricated bearings 37 and 37' each of which is of the tilting pad type and are restricted in axial movement. The bearings 37 and 37' are connected to the casing 30 via a pair of stems 38 and 38'. The rotor 33 carries a plate 40 which is connected to a second impeller 34b which will be detailed later and is restricted in the axial direction. On the left end as shown in FIG. 18, there is fixedly mounted a first impeller 34a which is in axial opposition and has an inlet port 35 to which a working gas is applied. The first impeller 34a is radially opposed to a first scroll 41 extending along a diffuser 36. On the right end of the rotor 33, there is fixedly mounted the second impeller 34b which is axially opposed to a second inlet port 42. The second impeller 34b is also radially opposed to second scroll 44 extending along a diffuser 43.

The rotor 33 has the enlarged portion 33a provided with a hole or inner space 116 within which a permanent magnet 113 is snugly and securely held in a manner similar to the aforementioned embodiments of FIGS. 1–17.

In this embodiment, at a front side of the first impeller 34a, there is installed a disc 45 which is rotatable together with the rotor 33. A plurality of equally pitched permanent magnets (not shown) are provided in the circumferential direction in the disc 45 and any one of the magnets, at any given time, is in opposition to an element 47 which functions to detect the angular position of the rotor 33 due to the location of the plurality of equally pitched magnets.

When an amount of current is supplied to the stator-coil 31b via reed wire 48 so as to constitute a magnetic field around the stator-core 31a which corresponds to the angular position of the rotor 33, the rotor 33 is brought into rotational movement together with the disc 44 and both impellers 34a and 34b. Since the bearings are of the gas-lubricating type, it is possible to raise the rotational speed of the rotor 33 up to or above 100,000 RPM by increasing the frequency of the current supplied to the stator-coil 31b. It is noted that heat generated by iron-loss at the stator-core 31a and copper loss at the stator-coil 31b is cooled within a jacket 49 into which an amount of cooling water is being supplied by inlet port 49a and resulting water is being drained through the outlet 50.

The working gas at the inlet port 35 is induced by the first impeller 34a and is compressed in a well-known manner at the diffuser 36 and the first scroll 41. The compressed working gas is, then, exhausted through the outlet port 41a and is applied to the second inlet port 42 via a cooler or heat exchanger (not shown) with cools the working gas. The working gas supplied to the second inlet port 42 is induced by the second impeller 34b and is compressed at the diffuser 43 and the second scroll 44. The working gas is further compressed and is exhausted through the outlet port 44a.

In this embodiment, since the permanent magnet 113 under pre-stressed condition is snugly held within the rotor 33, no breakage or separation therebetween can occur. It should be noted that manner for providing the permanent magnet in the rotor is similar to that of the embodiment of FIGS. 1 through 5. It should be also noted the magnetic resistance between the stator and the rotor becomes smaller due to high magnetic permeability of the magnetic metal.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A rotating apparatus comprising:

a stator;

a non-magnetic metallic rotor rotatably mounted in the stator, said rotor having a hole extending completely therethrough in a radial direction of said rotor;

a permanent magnet sized for insertion into said hole in a radial direction, said permanent magnet disposed within said hole symmetrically relative to a longitudinal axis of said rotor, a dimension of said permanent magnet in said radial direction being shorter than an outer diameter of said rotor, so that opposite ends of said hole define respective openings, each of said openings being bordered in said radial direction by said permanent magnet and in an axial direction by axially spaced wall portions of said hole; and a magnetic material filling each of said openings, said magnetic material being welded to said rotor to form a metallurgical connection therebetween such that the magnetic material is in a thermally deformed condition in contact with said permanent magnet to prestress said permanent magnet.

2. A rotating apparatus according to claim 1, wherein the permanent magnet has a pair of arc-shaped surfaces each of which borders a corresponding one of said openings.

3. A rotating apparatus according to claim 1, wherein said metallurgical connection is a laser beam weld.

4. A rotating apparatus according to claim 1, wherein said metallurgical connection is an electron beam weld.

5. An apparatus according to claim 1, wherein each of said openings is bordered in a circumferential direction of said shaft by circumferentially spaced walls of said shaft, said circumferentially spaced walls and said radially spaced walls being of one-piece integral construction with the portion of said rotor containing said hole.

* * * * *